Jan. 9, 1968  R. A. GROSGEBAUER ET AL  3,363,231

SEMITRAILER FOR SENSITIVE MATERIALS

Filed Feb. 4, 1965  6 Sheets-Sheet 1

INVENTORS:
ROGER A. GROSGEBAUER
RICHARD E. WERLING
LORIN C. STATEN
EDWARD L. SAENGER

BY: Thomas N. Brennan

Jan. 9, 1968  R. A. GROSGEBAUER ET AL  3,363,231
SEMITRAILER FOR SENSITIVE MATERIALS
Filed Feb. 4, 1965  6 Sheets-Sheet 3

INVENTORS:
ROGER A. GROSGEBAUER
RICHARD E. WERLING
LORIN C. STATEN
EDWARD L. SAENGER

BY: Thomas W. Brennan

INVENTORS:
ROGER A. GROSGEBAUER
RICHARD E. WERLING
LORIN C. STATEN
EDWARD L. SAENGER
BY: Thomas W. Brennan Jan. 9, 1968   R. A. GROSGEBAUER ET AL   3,363,231
SEMITRAILER FOR SENSITIVE MATERIALS
Filed Feb. 4, 1965   6 Sheets-Sheet 6

INVENTORS:
ROGER A. GROSGEBAUER
RICHARD E. WERLING
LORIN C. STATEN
EDWARD L. SAENGER
BY: Thomas W. Brennan

United States Patent Office 3,363,231
Patented Jan. 9, 1968

3,363,231
SEMITRAILER FOR SENSITIVE MATERIALS
Roger A. Grosgebauer, Ogden, Richard E. Werling and Lorin C. Staten, Brigham City, and Edward L. Saenger, Ogden, Utah, assignors to Thiokol Chemical Corporation, Bristol, Pa., a corporation of Delaware
Filed Feb. 4, 1965, Ser. No. 430,388
14 Claims. (Cl. 340—52)

ABSTRACT OF THE DISCLOSURE

A semitrailer of insulated semimonocoque body construction including cargo handling and tie-down apparatus, air conditioning system, shock absorbing suspension system and electrical warning system to indicate out-of-level vehicle condition while in motion and while stationary. Also provided is an electrical warning system to indicate whether the internal temperature is maintained within predetermined limits and a system of hydraulic jacks for storing the vehicle together with its cargo for extended periods.

This invention relates to vehicles for transporting and storing materials that are sensitive to temperature and shock. Particularly, it relates to semitrailers for transporting and storing large, ballistic missiles or rocket motors having propellant that is sensitive to temperature and/or shock.

The advent of large, multistage, solid-propellant missiles and their production in large numbers has imposed new and unique demands upon present day transportation and storage facilities. Such missiles have the following characteristics which must be considered in the construction of any vehicle intended for their handling, transportation, and/or storage: (1) they are of a generally fragile nature comprising cases of releatively thin and light-weight material sufficient only to contain the operating pressure imposed by the propulsive gases produced by combusting the propellants; (2) they contain propellant which is usually quite sensitive to temperature changes and to shock; and (3) they have lengths and weights not economically accommodated by present day automotive vehicles. In addition, any vehicle loaded with these gargantuan missiles will approach, if not actually exceed, the limits allowed by state and federal laws governing highway transportation. Therefore, vehicles of the class of the hereinafter to be described invention to be useful in transporting these very large missiles and/or motors must not only conform to the stringent requirements inherent in handling such dangerous materials in such extreme quantity but must also conform to highway regulations imposed and enforced by federal and state highway agencies.

Previously, many and varied attempts have been made by skilled artisans up to the present to supply an overland carrier capable of meeting these requirements, but these efforts, until now, have met with little or no success. The chief area of failure has been in not complying with maximum width and/or axle-load regulations for highway travel, and in failure to incorporate means to mitigate the effects of acceleration loads on the missile cargo caused by road irregularities and starting and stopping of the transporter. Other modes of transportation, for example, by air, are not only prohibitively expensive, but also unavailable for large-volume shipments.

The present invention, however, by providing an improved vehicle for transporting and storing large, multistage, ballistic missiles, overcomes these disadvantages and has been found to be satisfactory in moving these rocket motors and missiles to storage areas or launching sites.

Accordingly, it is an object of the invention to provide means for transporting storing, while transporting, materials of the character described which are shock and temperature sensitive.

Another object of the invention is to provide means for long distance transportation of large, multistage missiles loaded with temperature and shock sensitive propellant.

A further object is to provide means for storage during transportation of large, multistage missiles loaded with propellant of the type referred to under controlled temperature conditions.

Still another object of the invention is to provide a vehicle for transportation and storage while transporting, of temperature and shock sensitive materials which incorporates means for providing continuous temperature control and stable riding conditions.

A still further object of the invention is to provide a vehicle for storage of missiles during long-distance transportation which can accommodate a variety of combinations of existing rocket motors.

Other objects and advantages of the invention will become apparent as the following detailed description is read with reference to the accompanying drawings, wherein the same parts are designated by identical characters throughout the views.

The insulated body

Figure 1:
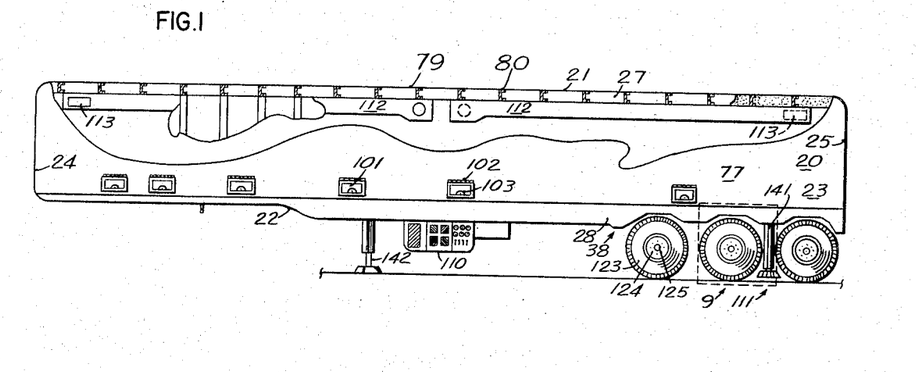
FIGURE 1 is a side elevation partially in section, of the invention.
Figure 3:
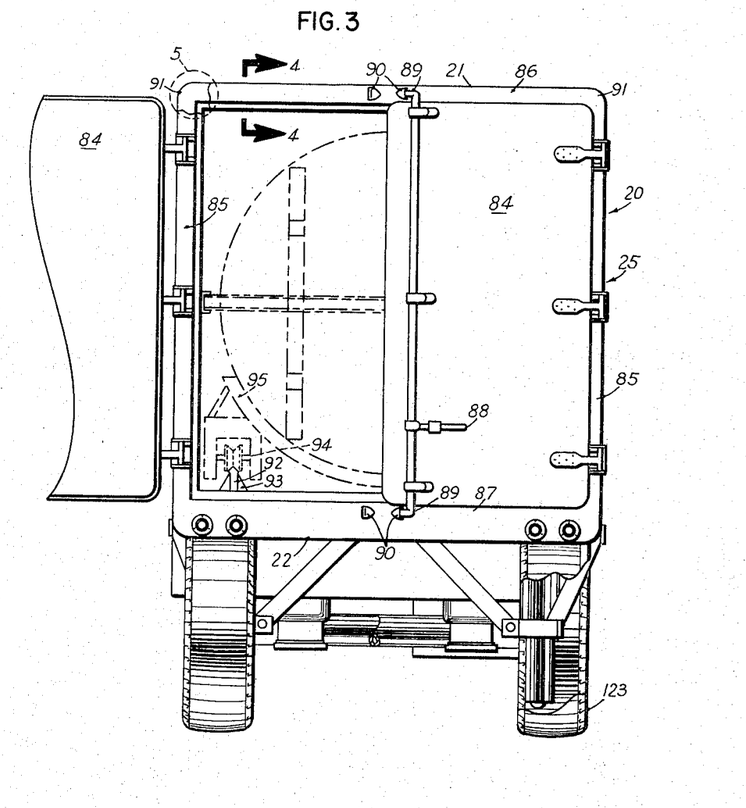
FIGURE 3 is a rear end elevation of the invention indicating end closures.

As shown in FIGURES 1 and 3, the invention comprises an insulated body 20 having a top member 21, a bottom member 22, a pair of side members 23, a forward member 24, and an aft-end member 25. Body 20 is of semimonocoque construction, i.e., some of the longitudinal stresses that may be experienced, are absorbed by the walls of the structure. This eliminates the necessity for longitudinal structural beams in addition to the minimal number used, so that body 20 may be of much lighter-weight construction than would otherwise be the case.

Figure 4:
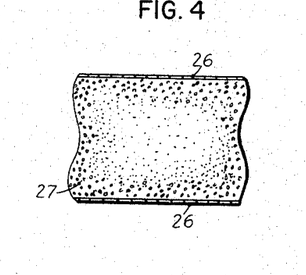
FIGURE 4 is a view taken on line 4—4 of FIG. 3 showing a portion of the wall construction.

The walls or body members 21 through 25 are constructed for light-weight and strength. As shown in FIG. 4, members 21 through 25, each comprise two parallel aluminum sheets 26 filled with plastic foam material 27.

To contain the plastic foam, structural members are provided that also serve to space the sheets 26 apart. The foam 27 may be any one or more of many kinds of foaming resin, preferably polyurethane, which is mixed with a foaming agent, of which there are many kinds, in the proper proportion to produce a foam of approximately 3 lb./cu. ft.

Bottom member

Bottom member 22, shown in FIGS. 2, 2a, 2b and 2c, is basically a riveted, rectangular structure formed by two long, parallel angle beams 28 fixed at their ends to two identical end members 29. Angle beams 28 each comprise a bottom flange 30 which extend toward each other, and a vertically disposed flange 31. Each end member 29 is a weldment best shown in cross section in FIG. 2c, and comprises a horizontal bottom plate 32, longitudinally formed as shown to provide a substantially vertical flange 33. A pair of transverse parallel plates 34 and 35 are welded perpendicular to bottom plate 32 substantially parallel to vertical flange 33. Plates 34 and 35 are joined by a horizontal cap plate 36, while outer vertical plate 34 and flange 33 are joined by a second cap plate 37. Cap plate 37 is positioned slightly lower with respect to cap plate 36 for juncture with mating parts.

Bottom member 22, bounded by the rectangular structure described, comprises three structurally different sections: (1) a running-gear section 38 extending from the aft end forwardly, a distance approximated three-fourths the length of bottom member 22 (FIGS. 2 and 2a), (2) the king-pin support section 39 (FIG. 2b), and (3) the flexible floor 40 (FIG. 2c).

Figure 2:
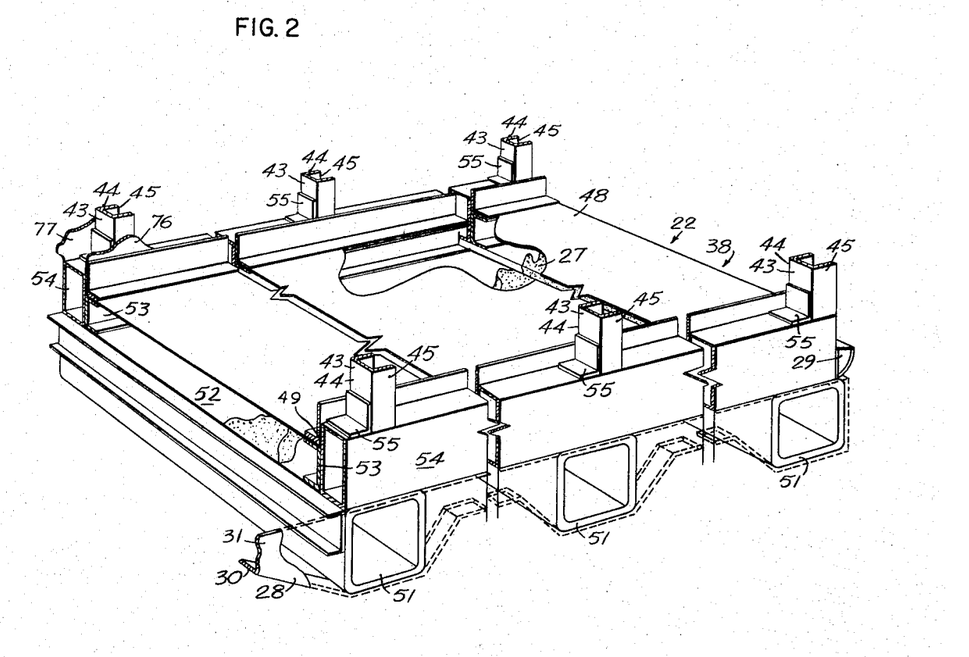
FIGURE 2 is a perspective, partially sectioned, view of a rear and bottom portion of the invention.

In running-gear section 38, a plurality of transverse, aluminum channel beams 41 extends between vertical flanges 31 of aluminum angles 28, being supported by and riveted to horizontal flanges 30. Webs 42 of channel beams 41 are riveted at the end portions thereof to webs 43 of vertically disposed aluminum channels 44. The outer flanges 45 of vertical channels 44 are riveted to vertical flanges 31 of long, horizontal angles 28. Rectangular pans 46 of aluminum formed from sheets, all edges of which are bent 90° in the same direction to form short flanges 47, are prepared to fit the spaces defined by the webs 42 of transverse channels 41 and vertical flanges 31 of long angles 28. Flanges 47 of aluminum pans 46 are riveted to corresponding webs 42 and flanges 31, allowing appropriate spaces between aluminum pans 46 and the tops of the transverse channels 41, for filling with plastic foam 27. A large floor sheet 48 of aluminum, having short flanges 49 along the longitudinal sides thereof, is prepared to fit the spaces between vertical flanges 31 of long, horizontal angles 28 for the full length of running-gear section 38 of bottom member 22, appropriate cutouts being provided along the sides of sheet 48 to accommodate vertical channels 44. Sheet 48 is riveted to top flanges 50 of transverse channels 41, flanges 49 of sheet 48 being riveted to vertical flanges 31 of long angles 28.

The structure of running-gear section 38, above-described, has a reinforced portion directly thereover to provide greater strength in this critical area. Transverse channel beams 41 are, in this portion, replaced by three large, box beams 51, the angle beams 28 being extendible downwardly to attach to box beams 51 in the same manner as they are attached elsewhere to channel beams 41. However, to afford proper insulation of this portion of running-gear section 38, box beams 51 are positioned on a level lower than that of the transverse channel beams 41 so that they may support a layer of foam 27 disposed between floor sheet 48 and a parallel aluminum sheet 52 which is directly on top of box beams 51. Sheets 48 and 52 are further supported and spaced apart along the longitudinal edges thereof by two parallel channel beams 53. Additional reinforcement is afforded this section by two long box beams 54, supported directly on the end portions of box beams 51 and disposed against the webs of channels 41 outwardly thereof. Box beams 54, in this section, form bases for vertical channel beams 44, which are further anchored to the tops of box beams 54 by small angle brackets 55. Supports (not shown) modify the forward end portion of this section for mounting of jacks.

Figures 2A, 2B, 2C:
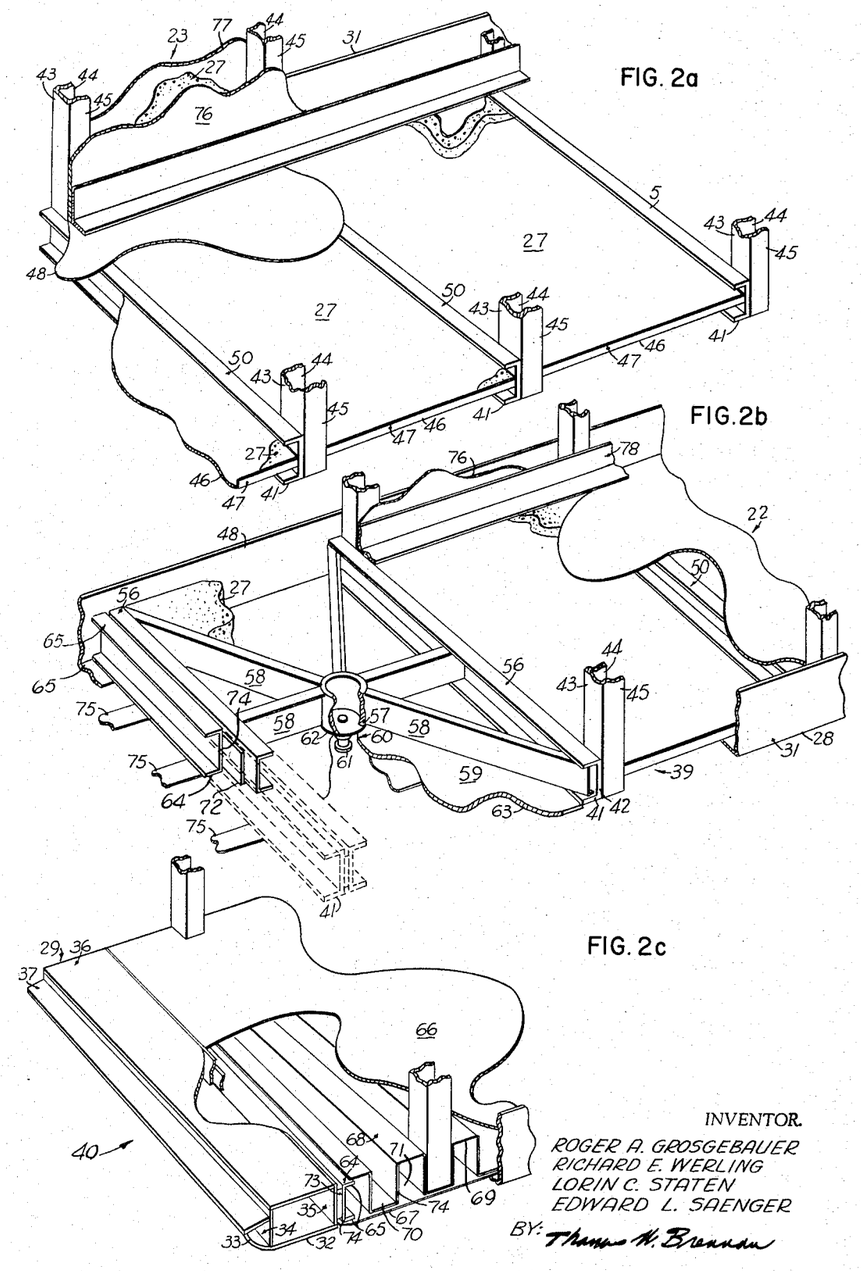
FIGURES 2a, 2b and 2c are perspective views, partially sectioned, of bottom portions of the invention, adjoining from the aft end forward, the portion shown in FIG. 2.

The extent of the kingpin support section 39, best shown in FIG. 2b, is defined by two transverse, steel channels 56, similar to channels 41 but somewhat heavier. They extend between vertical flanges 31 of angle beams 28 with flanges extending inwardly, and are riveted thereto. A short piece of steel pipe 57 is positioned in the center of the kingpin support section 39 and is supported in that position by six radial steel Z-beams 58 that are welded to steel pipe 57 and to angle beams 28 or to channel beams 56, as appropriate. A steel sheet 59 shaped to cover the entire kingpin support section is welded to the underside of the structure described, except for steel pipe 57. An opening 60 is provided in the center of sheet 59 so that a kingpin 61 may extend therethrough. An annular flange 62 on kingpin 61 is provided and is confined between the bottom of pipe 57 and steel sheet 59. Sheet 59 is reinforced by a square, heavy, steel plate 63 that extends between channel 56 and is welded to the underside of sheet 59 and also has a central hole to accommodate kingpin 61. All spaces in this structure are filled with plastic foam 27 described above and aluminum floor sheet 48 extends to cover the top of the entire structure and is welded thereto. Where welding between dissimilar metals, i.e., aluminum to steel, is difficult, or otherwise undesirable, sheet 48 can be made of steel or other suitable material.

Flexible floor section 40, FIG. 2c, extends between two channel beams 64, the bottom flanges of which are riveted at the end portions thereof to horizontal flanges 30 of angle beams 28. The flanges 65 of channel beams 64 extend toward each other and two large aluminum sheets, a top sheet 66 and a bottom sheet 67 extend between channels 64 and are riveted to the outsides of flanges 65. A third large aluminum sheet 68, having the longitudinal, cross-sectional form of a periodic square wave, the amplitude of which equals the height of the channels 64, also extends the full length of the flexible floor section between the channels 64. It is sandwiched between sheets 66 and 67, the crests 69 of the square wave being riveted to top sheet 66 and the valleys 70 being riveted to bottom sheet 67. All spaces 71 created by the sheet 68 between the sheets 66 and 67 are filled with plastic foam 27.

Flexible floor section 40 connection with adjacent kingpin support section 39 and end piece 29 is accomplished solely by long angle beams 28. Two rubber strips 72 (FIGURE 2b) and 73 (FIGURE 2c), bonded to the outside surfaces of webs 74 of channels 64, separate flexible floor section 40 from kingpin support section 39 and end piece 29, respectively. Three metal bars 75, extending the full length of flexible floor section 40 are fastened to the underside thereof to serve as lateral stabilizers of floor section 40, and may also be used as skids for a fifth wheel connector if desirable.

Sides, top and ends

Figure 5:
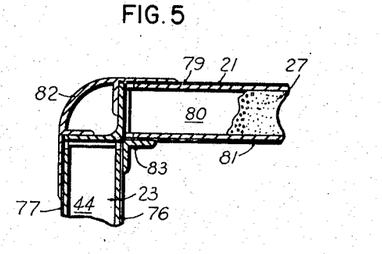
FIGURE 5 is a view of that part of the invention within the dash circle of FIG. 3.

Side walls 23 of trailer body 20 are each formed by two parallel sheets of aluminum, an inner sheet 76 and an outer sheet 77, riveted to the flanges of upright channel beams 44 (see also FIGURE 5). Two long angle beams 78 join the bases of inner sheets 76 to floor sheets 48 and 66 by rivets. All spaces in walls 23 between upright channels 44 and sheets 76 and 77 are filled with plastic foam 27, as shown in FIG. 4.

Top member 21 of semitrailer body 20 is of a construction similar to that of the side members 23. A top sheet 79 of aluminum is riveted to a plurality of transverse channel beams 80 spaced to lie in vertical planes common with side-member channels 44. A bottom sheet 81 (see FIGURE 5) is riveted to the opposite flanges of channels 80. All spaces between channels 80 and sheets 79 and 81 are filled with foam 27. Special, long moldings 82 join side-members 23 to top member 21. The inner walls of these members, composed of bottom sheet 81 and inner sheets 76 are joined by rivets to two long, angle beams 83 that extend the full length of body 20.

End members 24 and 25 of body 20 are formed by two large, identical double doors 84, shown in FIG. 3, hinged to moldings 85 at the ends of side members 23. A similar molding 86 is on each end of top member 21 to define the upper limits of doors 84. A special piece 87 is attached to each end piece 29 to define the lower limits of doors 84. Doors 84 are of hollow aluminum construction, filled with foam 27, and are equipped with conventional locking means with handles 88 and latches 89 insertable into opposing holes 90 in bottom end pieces 29 and in top-end moldings 86. Four special, partially spherical corner moldings 91 join moldings 82, 85 and 86.

Loading and tie-down means

Figure 6:
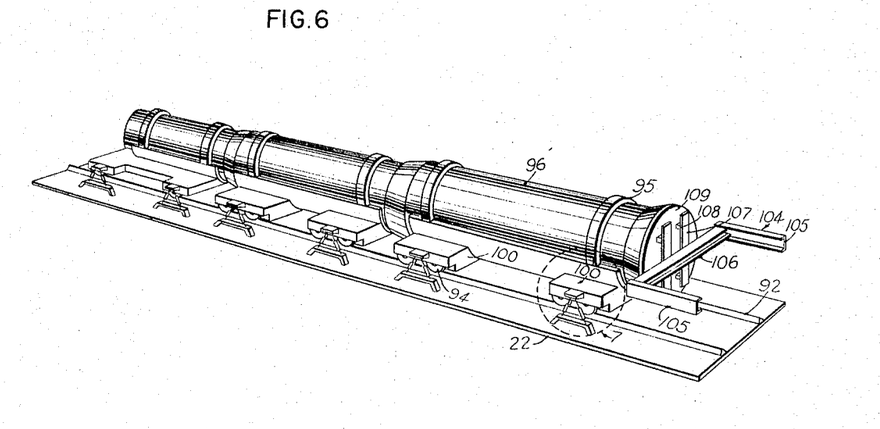
FIGURE 6 is a perspective view of the bottom portion of the invention illustrative of load tie-down means.
Figure 7:
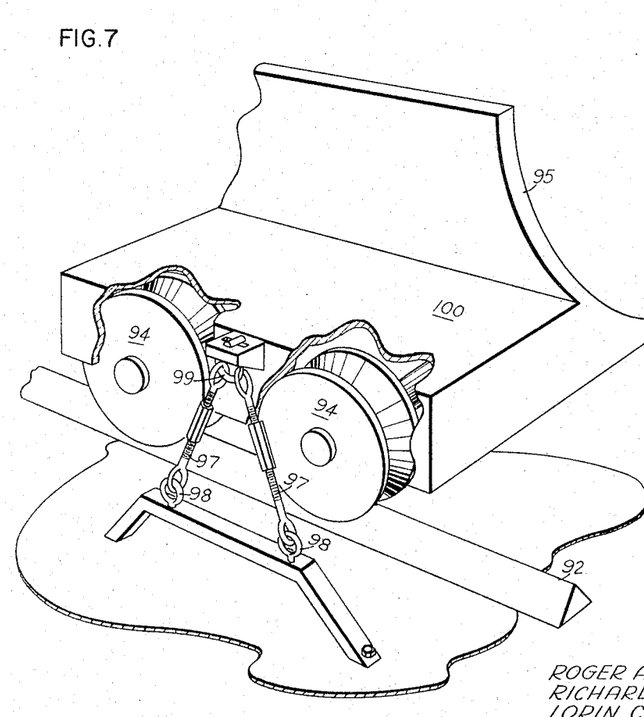
FIGURE 7 is a view of that part of the invention within the dash circle of FIG. 6, illustrative of the inner portions thereof.

Loading and tie-down equipment, shown in FIGS. 3, 6 and 7, includes two long parallel rails 92 fastened to bottom member 22 by supports 93. Rails 92 are spaced equidistantly from side members 23 and are spaced apart to be registrable with corresponding wheels 94 of a wheel box 100 comprising a harness 95 of a missile 96. The rails 92 assist in loading heavy missiles and tend to prevent any lateral motion thereon. A plurality of pairs of turnbuckles 97 connected to corresponding eyes 98 in bottom member 22 and with eyes 99 on wheel boxes 100 of missile harness 95. Turnbuckles 97 insure restraint of motion of the missile in lateral and vertical directions. A plurality of insulated access doors 101 are disposed along each side member 23 near bottom member 22, each door 101 being opposite a pair of turnbuckles 97 primarily for adjustment and inspection thereof. The doors 101 are hinged at the tops by piano hinges 102 and have handles 103 and appropriate latches not shown. Longitudinal restraint of the missile is effected by a large weldment 104 (FIG. 6). Two parallel channel beams 105, with their flanges extending toward each other, capable of being bolted to side members 23 are joined together with a transversally disposed H beam 106. Two parallel, vertical steel bars 107, welded to the forwarded flanges of the H beam 106 are attachable by brackets 108 to the aft fixture 109 of the missiles 96. The brackets 108 may be attached to the aft fixture 109 by screws or other conventional means not shown.

Loading of the missile 96 from an attendant vehicle may be accomplished by a power winch (not shown), of a type well-known in the art.

Air conditioning

Temperature within body 20 is controlled, within limits tolerable by the cargo, by an air conditioner 110 which is attached to the underside of bottom member 22 forwardly of running gear 111 (see FIG. 1). Two opposing ducts 112 having outlets 113 fastened to the underside of top member 21 deliver air of appropriate temperature from air conditioner 110 to the interior of body 20.

Figure 8:
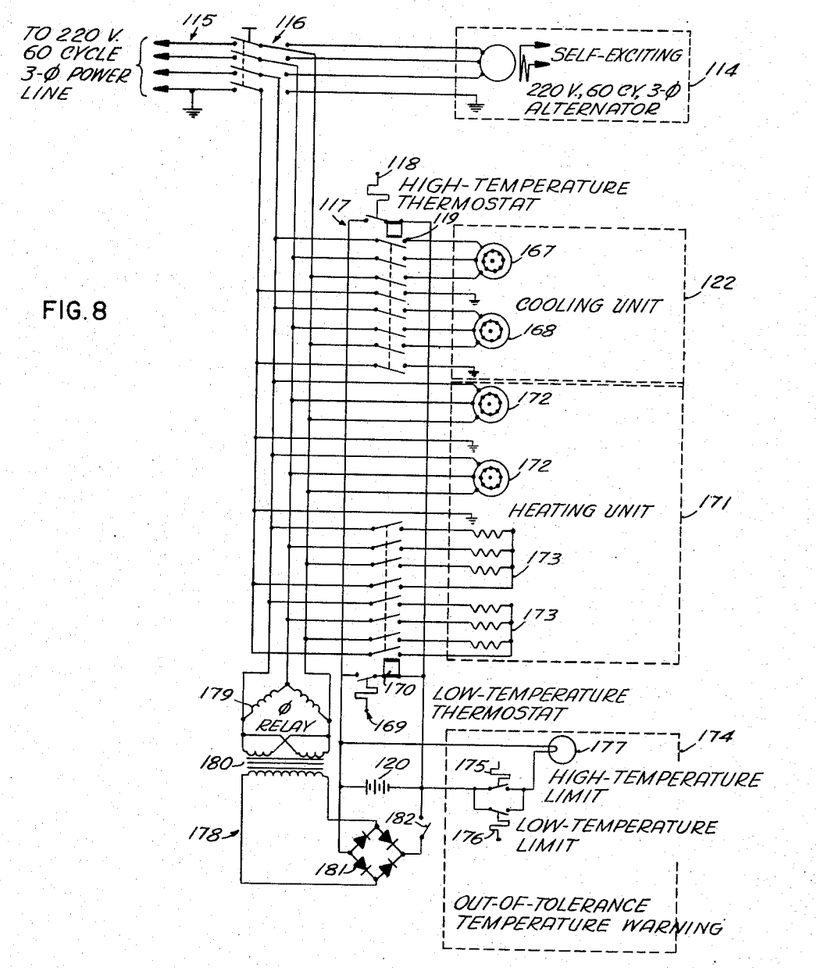
FIGURE 8 is an electrical schematic wiring diagram of a system for providing temperature control within the interior of the invention.

The schematic diagram of FIG. 8 illustrates the operation of the air conditioning means and attendant systems. The system is operable during highway travel by means of a 220 volt, 60 cycle, three-phase alternator 114 within air conditioner 110 and is driven by a small diesel motor (not shown). During storage of the missile 96, power is supplied by a 220 volt, 60 cycle, three-phase external power source 115 (FIG. 8). Power sources 114 and 115 are connected to the system by a selectively operated double-throw power switch 116.

A control circuit 117, powered by a rechargable battery 120, includes a high temperature thermostat 118 connected in series with a relay 119 and a parallel connection therewith of a low temperature thermostat 169 in series with a relay 170. When temperature within body 20 rises sufficiently to actuate high temperature thermostat 118, circuit 117 closes, and a relay 119 is energized to close the power circuits to a fan 167 and compressor 168 of a cooling unit 122, until the temperature within body 20 has cooled sufficiently to cause high temperature thermostat 118 to reopen circuit 117. When the temperature drops too low, low-temperature thermostat 169 actuates and closes circuit 117 energizing relay 170. Power circuits to the heaters 173 of the heating unit 171 are thereby closed and heat is generated. Fans 172 used in connection with unit 171 are always in operation to circulate air within body 20, regardless of temperature, thereby preventing development of temperature gradients therein.

A separate circuit for an out-of-tolerance, temperature warning system 174 is also provided and powered by battery 120. This circuit comprises a parallel connection of a high-temperature thermostat 175 and a low temperature thermostat 176 connected in series with an indicator lamp 177 and battery 120. Thermostats 175 and 176, set to actuate at the limits of temperature tolerance for the cargo, close the circuit and energize indicator lamp 177 whenever the temperature within the body 20 is outside predetermined limits. Indication system 174 is independent of control circuit 117 and lamp 177 may be observed either in the tractor operator's cab or on an external panel (not shown).

Battery charging circuit 178, connected to the power circuit includes a transformer 180 and a full wave rectifier 181 connected to battery 120. Circuit 178 is connectable to battery 120 through a switch 182. A phase relay 179 insures proper rotation of the fan and compressor motors 167, 168 and 172.

Running gear

The running gear 111 (FIGS. 1, 3, and 9) as will become apparent permits operation over varied terrain with minimum shock experienced by the cargo. To this end, large width, single tires 123 mounted on rims or wheels 123 are used rather than the customary dual type wheels. Assembled wheels 123 are arranged in three tandem pairs on appropriate axles 125. This arrangement also provides more than adequate supports and eliminates extra wheel height. Further to aid in eliminating shock, pneumatic suspension systems 126 are used for supporting each axle 125. Suspension systems 126 (FIG. 9) comprise a third-class lever 127 pivotally attached at one end to a fulcrum bracket 128 which is rigidly attached to the underside of bottom member 22. Axle 125 passes approximately through the center of lever 127, and the opposite end portion of the lever 127 is attached to the underside of bottom member 22 by an air bag 129, which provides a dampening resistance to road shocks and the like delivered to the axles 125 by the terrain traversed by the invention.

Figures 9, 10, 11:
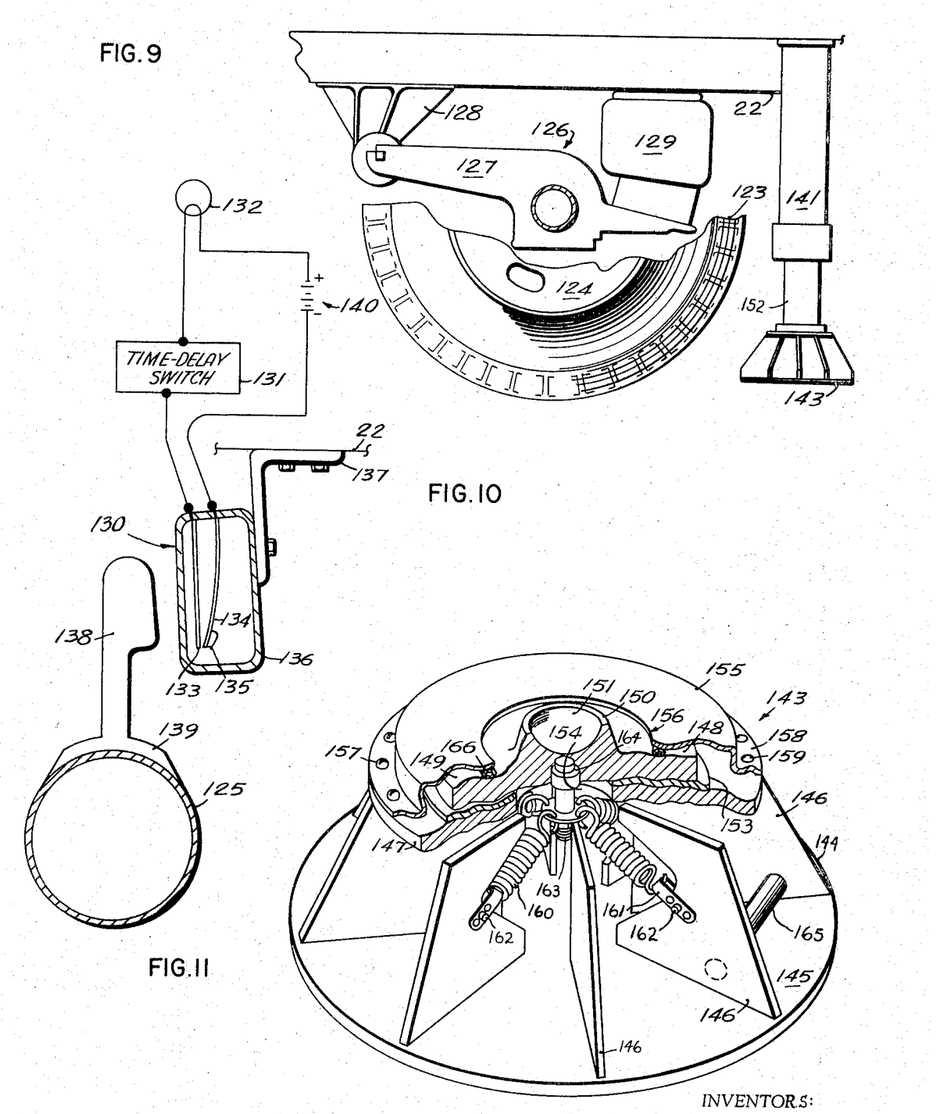
FIGURE 9 is a view of that part of the invention within the dash lines of FIG. 1, partially sectioned, to show the suspension system of the invention.
FIGURE 10 is an electrical schematic diagram, with some mechanical parts, illustrating the suspension-deflation warning system.
FIGURE 11 is a perspective view, partially sectioned, of a special jack pad of the invention.

In FIG. 10 there is illustrated in semischematic form, means comprising a special warning system whereby the tractor or vehicle driver is provided with forewarning of insufficient air contained by air bags 129. As indicated in FIG. 10, this warning system comprises a magnetic proximity switch 130, a time delay switch 131, and an indicator lamp 132.

Magnetic proximity switch 130 is a normally open, single throw, single pole type switch having a fixed contact 133 and a leaf spring contact 134 on which is mounted a small, permanent magnet 135. Switch 130 is mounted in an hermetically sealed, hollow capsule or housing 136, which, in turn, is centrally mounted on bottom member 22 over center axle 125 by a bracket 137. Switch 130 is positioned by bracket 137 so that an approach by a piece of paramagnetic material 138, mounted on center axle 125 by bracket 139, will enable the magnetic flux of magnet 135 to pass through the paramagnetic material 138 and close the switch 130. Such an approach by the paramagnetic material 138 is caused by deflation or partial deflation of at least one of air bags 129.

Proximity switch 130 is connected in series with a battery 140, a time delay switch 131, and an indicator lamp 132. Time delay switch 131 is of a conventional type which performs the function of energizing lamp 132 only when proximity switch 130 is closed for more than one-half second, so that spurious pulse signals caused by irregularities in the road will not energize lamp 132. This system also is used to indicate need for leveling the semitrailer during storage of a missile when the invention is immobile.

*Hydraulic jacks*

A hydraulic jacking system comprising two aft end jacks 141 and two forward jacks 142 (FIGS. 1, 3, and 9) is used to support missile 96 in a balanced position during storage thereof and to align the semitrailer with attendant vehicles during loading and unloading of missile 96. Each of the four jacks is independently controllable for accomplishment of the latter purpose.

In conventional vehicles, slippage or walking of one end of the vehicle usually occurs when the opposite end of the vehicle is raised by jacks. Such slippage could occur suddenly, giving a severe jolt to the missile. Therefore, to prevent such a shock or movement, unique jack pads 143 are provided for aft end jacks 141. Jack pads 143 permit a limited amount of motion specifically damped motion, in a horizontal plane, such motion being damped to prevent occurrence of dangerous shock acting upon missile 96.

Jack pads 143 (FIG. 11) have a circular base weldment 144 of aluminum. Base 144 comprises a base plate 145 on which are welded eight radially disposed trapezoidal brackets 146 perpendicular thereto. Brackets 146 are welded to the underside of a bearing plate 147, which supports a floating, stainless steel shoe 148. Shoe 148 comprises a relatively thick disk 149 having a raised, central boss 150 surrounding a hemispherical recess 151 to receive a jack shaft 152. A fiber glass ring 153 impregnated with polytetrafluorethylene surrounds a circular central opening 154 in bearing plate 147 and is bonded to the upper surface thereof to reduce friction between the bearing surfaces of shoe 148 and bearing plate 147 and to afford a seal against dust particles that may otherwise intrude between these surfaces. An annular fiber glass housing 155 forms a dust cover which surrounds shoe 148, except for a central circular opening 156 through which boss 150 may project. Housing 155 is fastened by screws 157 to bearing plate 147. An outwardly extending, annular flange 158 is provided with holes 159 registrable with corresponding holes in the bearing plate 147 through which screws 157 may pass. Automatic centering of shoe 148 and dampening forces experienced thereby is accomplished by radially disposed, tension springs 160, each of which is fastened at one end to an adjustable loop 161 anchored by a screw 162 to one of brackets 146 and fastened at the other end to a central stud 163 that depends through opening 154 from threaded engagement with a tapped hole 164 in the center of the underside of shoe 148. Opening 154 limits motion of the shoe 148. For handling convenience two tubular handles 165 are welded between opposite pairs of brackets 146. An annular, rubber O-ring seal 166 surrounds the opening 156 of the housing 155 and is bonded to the inside thereof to afford a seal between the housing 155 and the shoe 148.

Having described the invention and its component parts, it should not be limited in any manner or scope except as indicated and set forth in the subtended claims.

What is claimed is:

1. A semitrailer, attachable to a tractor having a fifth-wheel connector for transporting and storing multistage, ballistic missiles, said missiles comprising motors containing temperature and shock sensitive propellant and equipped with a wheeled holding harness comprising, an insulated body of semimonocoque construction having a top, bottom, side and end members, said members formed of two substantially parallel metal sheets spaced apart by force bearing beams and plastic foam material therebetween, a full opening access door in said end members, a plurality of access doors in said side members disposed near the bottom thereof, tie-down means for restraining said missile from moving relative to said body comprising a pair of parallel rails attached to the inside of said bottom member disposed longitudinally thereon and spaced apart to engage said wheeled harness on said missile, means for attaching said harness to said bottom member arranged along and adjacent to said rails, a removable support for rigidly bracing the aft end of said missile in the aft end body member, a kingpin connector depending from said bottom member near the forward end thereof, automatic air conditioning means in said body to maintain temperature within predetermined limits, said limits determined by the toleration levels of said missile propellant, a running gear comprising three tandem axles, a plurality of wheels arranged in pairs on said axles, and a pneumatic suspension system connecting said axles to said body aft of the center thereof.

2. The semitrailer of claim 1 wherein the structure of the bottom member forward of said kingpin is flexible, thereby facilitating connection of said kingpin to said fifth-wheel connector.

3. The semitrailer of claim 2 wherein said flexible portion of said bottom member attachment means are longitudinally extending side beams.

4. The semitrailer of claim 3 wherein said flexible floor comprises a top metal sheet, a bottom metal sheet parallel thereto, and an intermediate metal sheet, said intermediate metal sheet disposed between said top and bottom sheets in the form of periodic crests and valleys, said crests contacting said top sheet and said valleys contacting said bottom sheet.

5. The semitrailer of claim 1 wherein said insulated body further includes leveling means for facilitating cargo loading and storage thereof comprising, a system of hydraulic jacks comprising a plurality of independently-controllable jacks mounted on said bottom member in pairs, at least one pair of jacks mounted on said bottom member at the aft-end portion thereof and at least one pair of jacks attached to said bottom member forwardly of the center of mass of said semitrailer, and at least one of said pairs comprising means for permitting limited horizontal movement thereof.

6. The semitrailer of claim 5 wherein the means for permitting limited motion is a jack pad comprising a shoe connectable to one of said jacks, a base member for supporting said shoe, said shoe mounted on said base member in a horizontal plane relative thereto and movable in said plane, means for limiting the motion of said shoe, and means on said base for damping the motion of said shoe.

7. The semitrailer of claim 1 further including (A) an electrical warning system comprising means responsive to said pneumatic suspension system for indicating an un-level condition of said semitrailer, and (B) an electrical warning system responsive to temperature changes within said insulated body, and (C) visual indication means actuable by said responsive means.

8. The semitrailer of claim 7 wherein the electrical warning system responsive to said suspension system further includes a time-delay switch for delaying actuation of said visual indication means for at least one-half second.

9. The semitrailer of claim 7 wherein the electrical warning system responsive to temperature changes is a pair of bi-metallic thermostats, one responsive to a predetermined high temperature, and one responsive to a predetermined low temperature.

10. The semitrailer of claim 1 further including a suspension-deflation warning system comprising a series connected magnetic proximity switch, a time delay switch, an indicator lamp, an electric power source, and a paramagnetic actuator, said proximity switch and actuator mounted on one of said axles and said bottom with respect to each other so that deflation of said suspension system actuates said time delay switch.

11. The semitrailer of claim 1 wherein the pneumatic suspension means comprises a lever pivotally attached to said trailer body at one end and fixed to said axle substantially at its center, an air bag positioned on the underside of said vehicle body between said body and the opposite end of said lever to dampen the effects of road shocks on said axles.

12. A jack pad for a semitrailer capable of providing a base for a jack shaft comprising a shoe, said shoe formed in a thick disk having a central recess in the top thereof for receiving an end of said jack shaft, a base member comprising a base plate, a plurality of brackets perpendicularly mounted on said base plate, a bearing plate fixed to said brackets mounted parallel to said base plate and having a circular opening therein, a stud depending from the center of said shoe and extending through said circular opening in said bearing plate, a plurality of radially-disposed tension springs each attached at one end to said stud and at the opposite end to one of said brackets, and an annular housing attached to said bearing plate and surrounding said shoe for restricting horizontal motion thereof on said bearing plate.

13. The jack pad of claim 12 further including a first seal between said shoe and said housing, said first seal bonded to the inside of said housing and surrounding said central opening therein, and a second seal between said shoe and said bearing plate bonded to said bearing plate and surrounding said central opening therein.

14. A suspension-deflation warning system for a land-traveling vehicle having at least one wheeled axle and a body connected to and supported by said axle comprising series connected, normally open magnetic proximity switch, time delay switch, and an indicator lamp to an electric power source, a paramagnetic actuator and a pneumatic suspension system said switch and actuator mounted in said axle and on said body so that deflation of said pneumatic suspension system will cause said switch and actuator to be brought into proximity for a time sufficient to close said time delay switch, whereby said lamp is energized by said power source.

References Cited

UNITED STATES PATENTS

| | | | |
|---|---|---|---|
| 2,766,439 | 10/1956 | Palm | 340—52 X |
| 2,901,283 | 8/1959 | Curell | 296—28 |
| 3,003,810 | 10/1961 | Kloote et al. | 296—31 |
| 3,081,109 | 3/1963 | Davies et al. | 280—423 |
| 3,182,956 | 5/1965 | Dalton | 280—150.5 X |
| 3,219,362 | 11/1965 | Epstein | 254—86 X |

THOMAS B. HABECKER, *Acting Primary Examiner.*

NEIL C. READ, *Examiner.*

D. L. TRAFTON, *Assistant Examiner.*